US008398482B2

(12) United States Patent
Brown

(10) Patent No.: US 8,398,482 B2

(45) Date of Patent: Mar. 19, 2013

(54) COMBINATION CASINO KIOSK AND NOTIFICATION RESULT RESPONDER DEVICE AND METHOD THEREFOR

(76) Inventor: Vincent Brown, Las Vegas, NV (US)

( * ) Notice: Subject to any disclaimer, the term of this patent is extended or adjusted under 35 U.S.C. 154(b) by 83 days.

(21) Appl. No.: 12/950,025

(22) Filed: Nov. 19, 2010

(65) Prior Publication Data

US 2011/0287840 A1 Nov. 24, 2011

Related U.S. Application Data

(60) Provisional application No. 61/263,098, filed on Nov. 20, 2009.

(51) Int. Cl.
*G06F 17/00* (2006.01)

(52) U.S. Cl. ........................................................ 463/25

(58) Field of Classification Search .............. 463/16–26, 463/41, 42, 43
See application file for complete search history.

(56) References Cited

U.S. PATENT DOCUMENTS

| | | | | |
|---|---|---|---|---|
| 2004/0259626 | A1* | 12/2004 | Akram et al. | 463/17 |
| 2008/0076505 | A1* | 3/2008 | Nguyen et al. | 463/16 |
| 2009/0124350 | A1* | 5/2009 | Iddings et al. | 463/25 |
| 2009/0264190 | A1* | 10/2009 | Davis et al. | 463/26 |
| 2010/0087241 | A1* | 4/2010 | Nguyen et al. | 463/17 |
| 2011/0105206 | A1* | 5/2011 | Rowe | 463/9 |

* cited by examiner

*Primary Examiner* — Ronald Laneau

(74) *Attorney, Agent, or Firm* — Cardinal Law Group

(57) ABSTRACT

A gaming system has a gaming machine. The gaming machine transmits a signal to a remote device indicating a winning round.

12 Claims, 6 Drawing Sheets

COMBINATION CASINO KIOSK AND NOTIFICATION RESULT RESPONDER DEVICE AND METHOD THEREFOR

RELATED APPLICATIONS

This application is related to U.S. Provisional Application Ser. No. 61/245,576, filed Sep. 24, 2009, in the name of the same inventor, and entitled, "COMBINATION CASINO KIOSK AND NOTIFICATION DEVICE", U.S. Provisional Application, Ser. No. 61/263,098, filed Nov. 20, 2009 and is hereby incorporated into the present application. The present application further claims the benefit of the aforementioned provisional applications.

FIELD OF THE INVENTION

The present invention relates generally to a casino kiosk and, more specifically, to a casino kiosk for allowing a customer to play numerous casino games at the same time, the kiosk issuing a notification signal to inform the customer if the customer has won even if the customer is not in the vicinity of the casino kiosk.

BACKGROUND OF THE INVENTION

Presently, there are many different wagering games used in gambling establishments. The problem with most of these games is twofold. First, the customer needs to remain at the gaming machine/gaming table to play. If a customer leaves a table or machine, the customer generally has no ability to continue to play. While the customer may ask a friend to continue to wager, the customer has no ability to actually control his/her friend's actions. Further, once a customer leaves a gaming table/machine, the customer generally loses his/her spot and is unable to continue to play.

Second, in general, a customer can only play one casino game at a time. It would be extremely difficult for a customer to move among two or more casino tables/machines even if the casino tables/machines are next to one another. Another issue with many casino wagering games are that many casino games are difficult to understand. This relates to not only how to play the casino game but also the strategy involved in playing. Thus, many people who would normally like to play and gamble end up not playing.

Therefore, it would be desirable to provide a system and method to overcome the above problem.

SUMMARY

A gaming system has a gaming machine. The gaming machine transmits a signal to a remote device indicating a winning round.

A gaming system has a gaming kiosk. The gaming kiosk has an input device for selecting a casino game to be played via the gaming kiosk, gaming rounds to be played, and game criteria. A transmitter device is provide for transmitting game notification signals to a remote device to indicate one of a winning or losing round by a player.

The features, functions, and advantages can be achieved independently in various embodiments of the disclosure or may be combined in yet other embodiments.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DETAILED DESCRIPTION

Figure 1:
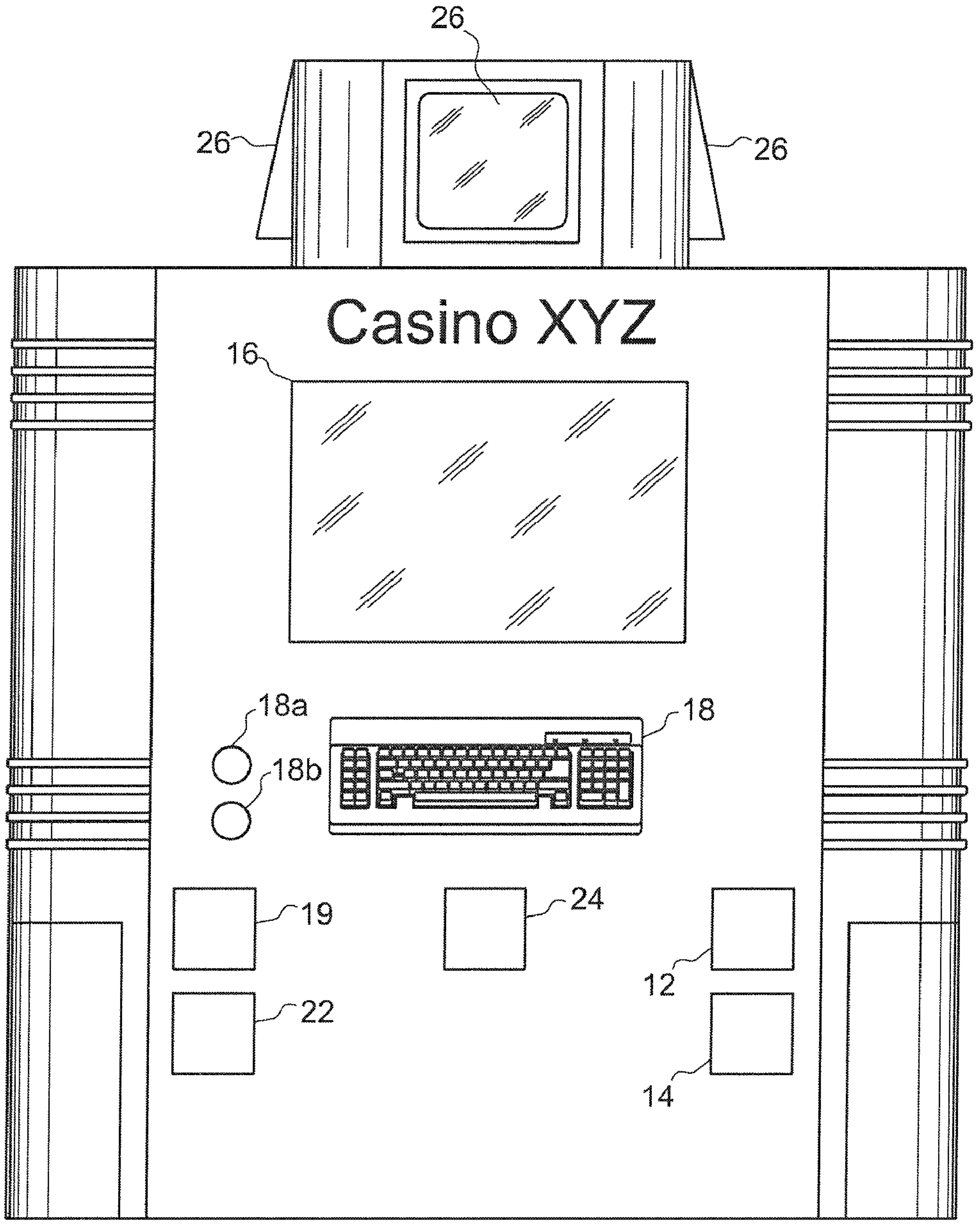
FIG. 1 is a perspective view of one embodiment of a casino kiosk of the present invention.

Referring to FIG. 1, a casino kiosk 10 is shown. The casino kiosk 10 allows a customer to select a plurality of casino games to play at a predetermined time. The customer will then be notified if he/she has won anything once the casino game has been played.

The casino kiosk 10 is a free standing unit. The casino kiosk 10 may have a card reader 12. The card reader 12 may be used to read a casino club card, a credit card, or the like. The casino kiosk 10 may also have a monetary intake device 14. The monetary intake device 14 may be used to insert currency into the casino kiosk 10. A user may insert a casino club card, a credit card, or the like into the card reader 12 or insert currency (paper or coins) into the monetary intake device 14 to play one or more casino games via the casino kiosk 10.

The casino kiosk 10 may have a first screen 16. The first screen 16 can be an LED screen, plasma screen, DLP screen, or the like. The listing of the above is given as an example and should not be seen in a limiting manner. The first screen 16 may be used to display gaming information to the customer. In accordance with one embodiment, the first screen 16 will show a main menu listing all the casino games that may be played on the casino kiosk 10. The user may select one or more games to play by using an input device 18. The input device 18 may be a keyboard, a mouse, roller ball, or the like. The listing of the above is given as an example and should not be seen in a limiting manner. Alternatively, the first screen 16 may be a touch screen. The user may select one or more games to play by touching a desired location on the first screen 16.

The casino kiosk 10 may allow a customer to play casino games such as roulette, keno, bingo, and the like. Other games such as poker, twenty-one, and the like may also be played. The listing of the above casino games should not be seen in a limiting scope.

Once a person selects a game to be played, the first screen 16 may show different playing options on the first screen 16 as will be disclosed below. Once the playing options are entered, the customer will be issued a notification device 20 (FIG. 3) which is dispensed by the casino kiosk 10 via a dispensing device 19. The notification device 20 will inform the customer if he or she has won. Thus, the customer may leave the casino kiosk 10 area and still be informed if he/she has won. If the notification device 20 informs the customer that he/she has won, the customer may return to the casino kiosk 10 and insert the notification device 20 into a reader 22.

The reader 22 will determine if the customer is holding a winning notification device 20. If so, the casino kiosk 10 will issue either the monetary winnings or a voucher to turn into a cashier via a payout device 24.

Alternatively, once a person selects a game to be played, and the playing options are entered, the customer may enter a telephone number via the input device 18. The kiosk 10 may then send a signal to the telephone number entered to inform the customer if he or she has won. Thus, the customer may leave the casino kiosk 10 area and still be informed if he/she has won. In accordance with one embodiment, a text message is sent to a cellular phone 60 (See FIG. 6) of the customer to inform the customer that he/she has won. The text message may include information such as the round the customer won, the dollar figure the customer has won, etc. The text message may further include a security number which the customer may be required to enter in order to receive his/her winnings.

If the customer receives a signal on his/her cellular telephone 60 of a winning round, the customer may return to the casino kiosk 10 to collect his/her winnings. The customer may enter his/her telephone number. The customer may further be required to enter the security number. The above information is entered into the kiosk 10 via the input device 18. Once the information is entered, the kiosk 10 will verify the information to determine if the customer had a winning round. If so, the casino kiosk 10 will issue either the monetary winnings or a voucher to turn into a cashier via a payout device 24.

The casino kiosk 10 may have a second screen 26. The second screen 26 may be placed on a top area of the casino kiosk 10. The second screen 26 may be an LED screen, plasma screen, DLP screen, or the like. The listing of the above is given as an example and should not be seen in a limiting manner. The second screen 26 may be used to show a current casino gaming being played. While the embodiment shown in FIG. 1 shows only one side of the casino kiosk 10, it should be noted that each side of the casino kiosk 10 may have the features shown in FIG. 1. This may allow the casino kiosk 10 to have multiple customers using the casino kiosk 10 at the same time.

Figure 2:
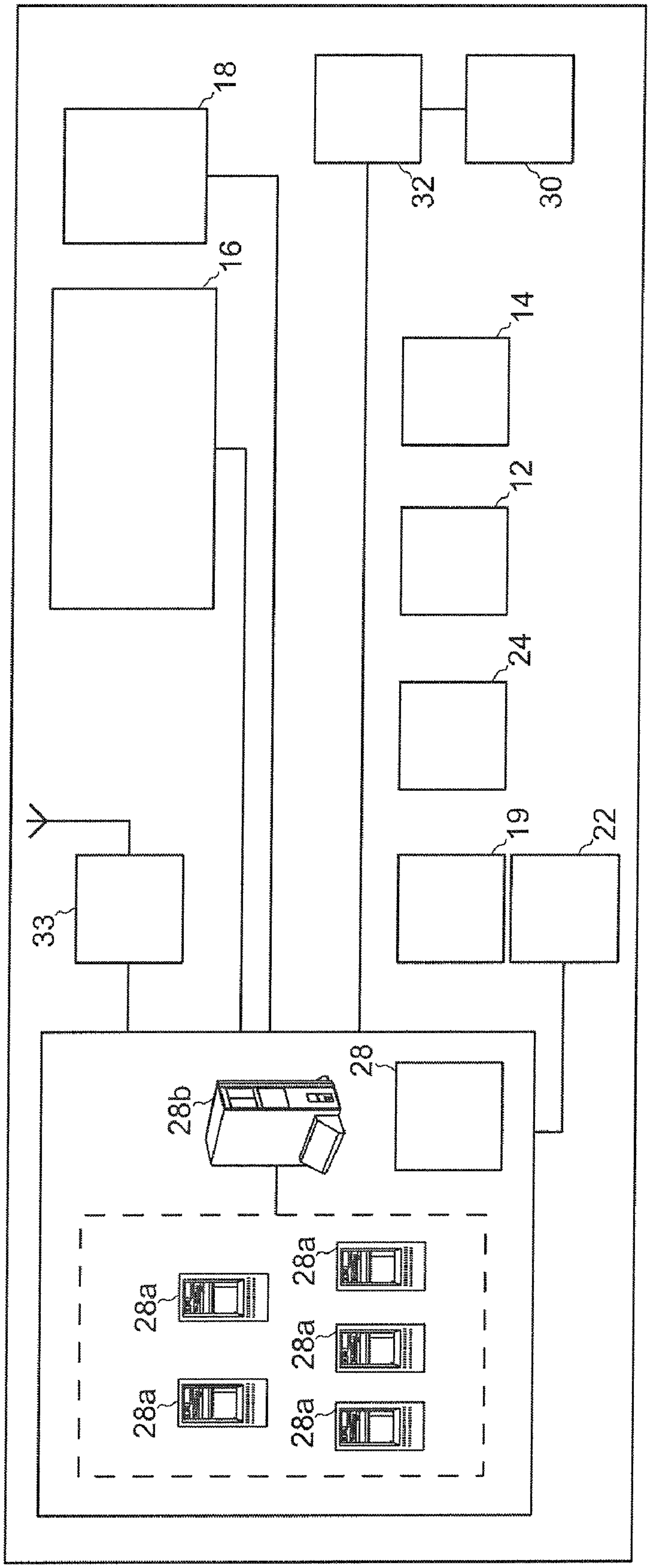
FIG. 2 is a block diagram of one embodiment of the circuitry of the casino kiosk shown in FIG. 1.

Referring to FIGS. 1 and 2, a simplified block diagram of the casino kiosk 10 is shown. As stated above, the casino kiosk 10 may have a card reader 12 to read a casino club card, a credit card, or the like; a monetary intake device 14 to insert currency into the casino kiosk 10; a first screen 16 to display gaming information to the customer; an input device 18; a dispensing device 19 for dispensing a notification device 20 by the casino kiosk 10; a reader 22 to scan a notification device 20 to determine if the customer holding a winning notification device 20 is a winner; a payout device 24; a second screen 26.

The casino kiosk 10 may have a gaming CPU 28. The gaming CPU is used to control the casino kiosk 10. The gaming CPU is used to control all of the different casino games that may be played on the casino kiosk 10. Alternatively, the CPU 28 may be replaced by a plurality of game servers 28A. Each game server 28A may be used to control a particular casino game of the casino kiosk. Each game server 28A may be coupled to additional casino kiosks 10. This may allow multiple casino kiosks 10 to be linked together which may allow for progressive jackpots to be awarded for the different casino games based on casino selected criteria. If game servers 28A are used, then the game servers 28A may be stored in secure area of the casino and coupled to a gaming server 28B in the casino kiosk 10.

The CPU 28 or the game servers 28A may be coupled to the first screen 16. The first screen 16 will display a menu of all of the casino games that may be played via the casino kiosk 10. The customer may select multiple casino games to play. Each game will function in a different manner as described below. In general, each casino game will allow a customer to play a designated number of rounds. The customer may select how to wager in each round. This information is then programmed onto a notification device 20 by the casino kiosk 10.

As shown in FIG. 2, the casino kiosk 10 may have a storage unit 30. The storage unit 30 may be used to house a plurality of the notification devices 20. A read write device 32 will program a designated notification device 20 with the designated casino game, round, and wager information. This information as well as an identification number of the designated notification device 20 may be stored in a memory of the CPU 28 or the game servers 28A. The casino kiosk 10 may then dispense the notification device 20 to the customer. Once a round has been played for each casino game, the CPU 28 or the game server 28A may determine if there is a winning wager. If there is a winning wager, the casino kiosk 10 may send a signal to a winning notification device 20 indicating the winning wagers. In accordance with one embodiment, the CPU 28 or the game servers 28A or 28B may send a notification signal indicating a winning wager to a transmitting device 33. The transmitting device 33 may send a notification signal to a notification device 20 indicating the winning wagers.

Figure 5:
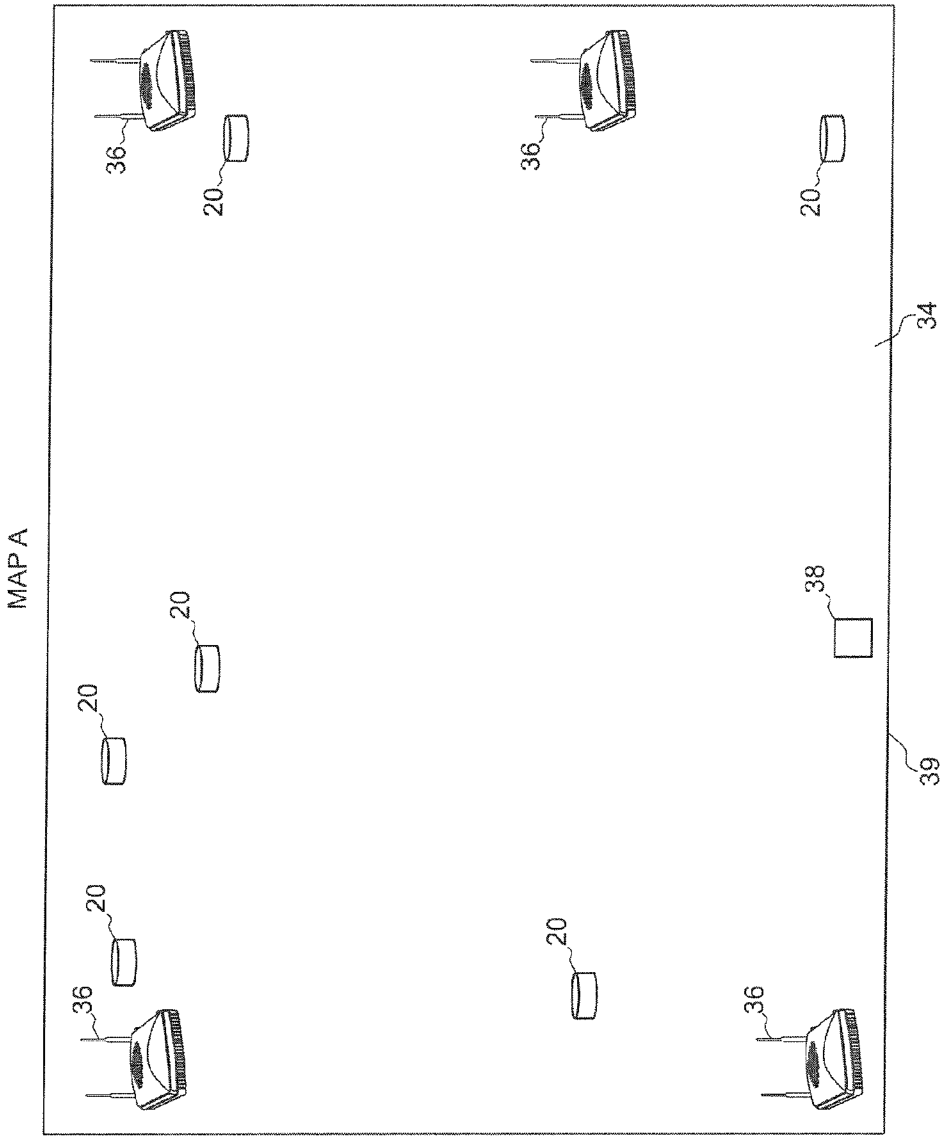
FIG. 5 is a block diagram of a casino floor using the present invention.

Referring to FIG. 5, in order to expand coverage, the casino floor area 34 may have a plurality of transmitter/receiver devices 36. The transmitter device 36 may be located around a perimeter of the casino floor area 34. While only four transmitter/receiver devices 36, this should not be seen in a limiting manner. The notification signal sent by the transmitting device 33 may be received by one or more of the transmitter/receiver devices 36 which transmits the notification signal over the casino floor area 34. As long as the notification device 20 is in range of one or more of the transmitter/receiver devices 36, the notification device 20 may receive the notification signal indicating the winning wagers.

In accordance with one embodiment, disabling device 38 may be positioned around the casino floor area 34. In accordance with one embodiment, the disabling device 38 may be positioned around exits 39 of the building housing the casino floor area 34. The disabling device 38 may deactivate the notification device 20 once a person passes the disabling device 38. Thus, a person who plays the casino kiosk 10 but leaves the building will not be notified if he/she wins.

Figure 3A:
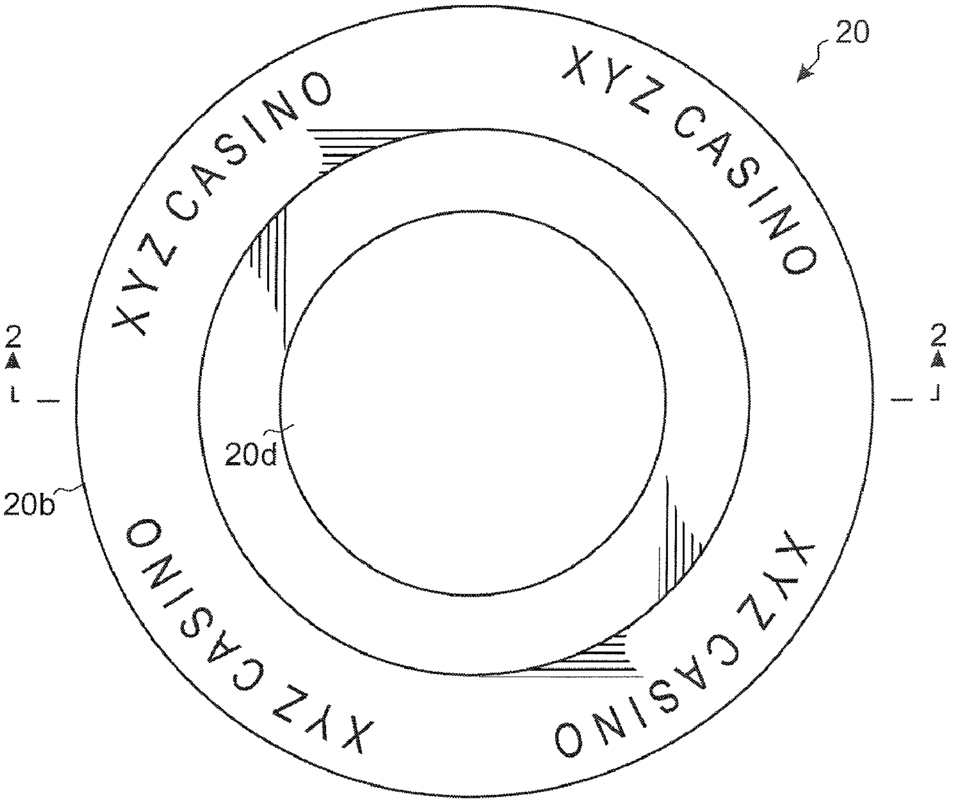
FIG. 3 is a perspective view of one embodiment of the notification device issued by the casino kiosk.
Figure 3B:
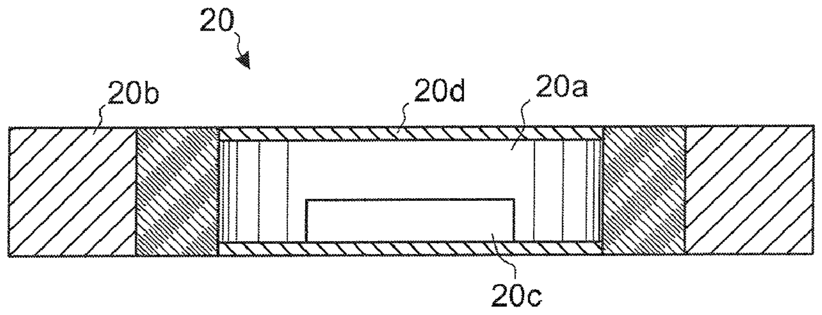
Figure 4:
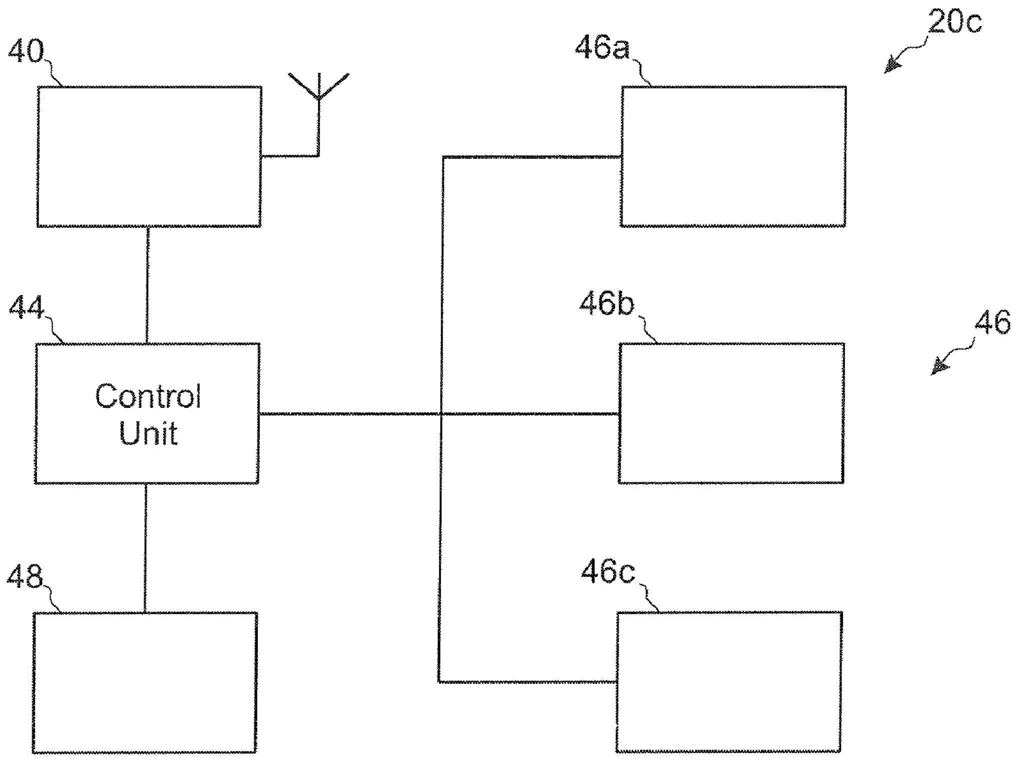
FIG. 4 is a block diagram of one embodiment of the circuitry of the notification device shown in FIG. 3.

Referring now to FIGS. 3-4, one embodiment of the notification device 20 is shown. The notification device 20 may take on the form of a casino chip. In the present embodiment the notification device 20 is circular in shape. However, this is given as an example and should not be seen in a limiting scope. The notification device 20 may have a solid outer perimeter 20B. The solid outer perimeter 20B may be formed of plastic, wood, or other similar types of material. The notification device 20 may have a hollow interior section 20A. The hollow interior section 20A may be used to house a notification circuit 200. The notification circuit 20C may be used to inform the customer that he/she has a winning wager. The notification circuit 20C may provide visual, audible, and or a sensory indication of a winning wager.

The notification device 20 may have a clear or opaque surface 20D. In the present embodiment, a top and bottom center surface is clear or opaque. The clear or opaque surface 20D may be used to provide a visual indication by the notification circuit 20C of a winning wager.

As seen more clearly in FIG. 4, notification circuit 20C may have a receiver 40. The receiver 40 may have an antenna

42 coupled thereto. Alternatively, the receiver 40 may have a built-in antenna in the receiver 40. The receiver 40 in combination with the antenna 42 or the built-in antenna may be used to receive the notification signal transmitter by the transmitting device 32. The receiver 40 may be coupled to a controller 44. The controller 44 may be used to decode the notification signal received and to control the operation of the notification circuit 20C. The controller 44 may be coupled to one or more notification devices 46. The notification devices 46 may include but are not limited to: visual indicator 46A, audible indicator 46B, sensory indicator 46C and the like. The visual indicator 46A may be one or more lights. The lights may be light bulbs, LEDs, or the like. The one or more lights may illuminate, flash, or the like to indicate a winning wager. The audible indicator 46B may be one or more speakers or the like. The one or more speakers may be used to provide an audible indication of a winning wager. For example, the audible indicator 46B may beep if the customer has a winning wager. The sensory indicator 46C may be a vibrating unit such as a piezoelectric device or the like. The vibrating unit may be used to vibrate the notification device 20 to indicate a winning wager. The notification circuit 20C may be powered by a power source 48. The power source may be a battery such as a rechargeable battery, a lithium battery, or the like.

Referring now to FIGS. 1-5, in operation, the casino kiosk 10 may allow a customer to play casino games such as roulette, keno, bingo, and the like. Other games such as poker, twenty-one, and the like may also be played. Once a person enters insert a casino club card, a credit card, or the like into the card reader 12 or insert currency into the monetary intake device 14, the customer may play one or more casino games via the casino kiosk 10. The customer may press an input button 18A or 18B to select either a live casino game or a computer based casino game.

The customer may view the first screen 16 to select a game to be played. The first screen 16 will show different playing options based on the casino game selected. In general, for each casino game, the customer may select, the time period to play, a desired round to play and a wager option. In a live casino game, the customer will view a live casino game which is being played on the casino floor 34 and shown on the screens 16 and or 26. The customer may then select a particular round or time for playing. Alternatively, the customer may play the current round of the live casino game via the kiosk 10. The same is true if the user selects a computer based casino game.

Roulette

In a computer based roulette, the CPU 28 or the game servers 28A (hereinafter CPU 28) may control the roulette game. The CPU 28 will play a predetermined number of rounds each hour. Each round played may be shown on the second screen 26. Each round may also be shown on videos placed throughout the casino floor 34. When a customer decides to play, the customer will determine when the customer wants to play, how many rounds to play, and the different bets the customer wants to play. Thus, for example, the first screen may show the different times a customer may play. Once a user inputs a time (i.e., 1:00 pm), the customer will determine how many rounds he/she wishes to play. For example, in roulette each hour 12 rounds of roulette may be played (i.e., 1:00 pm, 1:05 pm, 1:10 pm, 1:15 pm, . . . 1:55 pm). The user may select the time and round(s) the customer wishes to play and inputs this information using the input device 18. The user will then input the wagers. In accordance with one embodiment, a roulette table may appear on the first screen 16. The user may then move the input device 18 to select wager locations and to enter a monetary wager for each location. Once this is done, the casino kiosk 10 may store the information in the memory of the CPU 28 or other memory of the casino kiosk 10. The information may be programmed onto a notification device 20. An identification number of the notification device 20 may be stored in the memory of the CPU 28 or other memory device along with the betting information. Once a round is played, the transmitter 33 will send out a notification signal of winner wagers for that particular round. The notification signal may further be received and resent via the transmitter/receiver devices 36. Winner notification devices 20 will receive the notification signal and send one of a visual, audible or sensory signal to indicate a winning wager.

In a live roulette game, the customer may have two different options. The customer may play a current round and input betting options on the first screen 16 via an input device 18. The CPU 28 will monitor winnings and credits remaining. The CPU 28 may have a lockout feature that prohibits betting once the current round has started or once the ball is placed on the roulette table. Alternatively, the customer will determine when the customer wants to play, how many rounds to play, and the different bets the customer wants to play. Thus, for example, the first screen may show the different times a customer may play. Once a user inputs a time (i.e., first full round starting at 1:00 pm), the customer will determine how many rounds he/she wishes to play. For example, the customer may input 10 rounds of roulette starting at 1:00 pm. The user inputs this information using the input device 18. The user will then input the wagers. In accordance with one embodiment, a roulette table may appear on the first screen 16. The user may then move the input device 18 to select wager locations and to enter a monetary wager for each location. Once this is done, the casino kiosk 10 may store the information in the memory of the CPU 28 or other memory of the casino kiosk 10. The information may be programmed onto a notification device 20. An identification number of the notification device 20 may be stored in the memory of the CPU 28 or other memory device along with the betting information. Once the live round is played, the transmitter 33 will send out a notification signal of winner wagers for that particular round. The notification signal may further be received and resent via the transmitter/receiver devices 36. Winner notification devices 20 will receive the notification signal and send one of a visual, audible or sensory signal to indicate a winning wager.

Bingo

In the computer bingo game, the CPU 28 may control the bingo game. The CPU 28 will play a predetermined number of rounds each hour. Each round played may be shown on the second screen 26 and or screens located throughout the casino floor 34. When a customer decides to play, the customer may determine when the customer wants to play, how many rounds to play, and the different bets the customer wants to play. Thus, for example, the first screen 16 may show the different times a customer may play. Once a user inputs a time (i.e., 1:00 pm), the customer will determine how many rounds he/she wishes to play. For example, in bingo each hour 5 rounds of bingo may be played (i.e., 1:10 pm, 1:20 pm, 1:30 pm, 1:40 pm, and 1:50 pm). The user may select the time and which round the customer wishes to play and inputs this information using the input device 18. The user may then select a bingo playing card. Different bingo playing cards may be displayed on the first monitor 16. Alternatively, the customer may be able to pick the numbers and locations of the numbers on a bingo card. Further, the casino kiosk 10 may select the bingo playing card. The user may then select different wager options. For example, the customer may select to wager to have the first winning bingo card, select bingo having a predefined pattern, and the like. Once this is done, the casino kiosk 10 may store the information in the memory of the CPU 28 or the game servers 28A. The information may be programmed onto a notification device 20. An identification number of the notification device 20 may be stored in the memory of the CPU 28 or other memory device of the casino kiosk 10 along with the betting information. Once a round is played, the transmitter 33 will send out a notification signal of winner wagers for that particular round. The notification signal may further be received and resent via the transmitter/receiver devices 36. Winner notification devices 20 will receive the notification signal and send one of a visual, audible or sensory signal to indicate a winning wager. A live bingo game works in the same manner but the live game is shown on the screens 16 and or 26. The user may stay at the kiosk 10 to watch and play or may leave with the notification device 20.

Keno

In the computer keno game, the CPU 28 may control the keno game. The CPU 28 will play a predetermined number of rounds each hour. Each round played may be shown on the second screen 26 or screens located throughout the casino floor 34. When a customer decides to play, the customer may determine when the customer wants to play, how many rounds to play, and the different bets the customer wants to play. Thus, for example, the first screen 16 may show the different times a customer may play. Once a user inputs a time (i.e., 1:00 pm), the customer will determine how many rounds he/she wishes to play. For example, in keno each hour 5 rounds of keno may be played (i.e., 1:10 pm, 1:20 pm, 1:30 pm, 1:40 pm, and 1:50 pm). The user may select the time and which round the customer wishes to play and input this information using the input device 18. The customer may then select the numbers he/she is wagering. The customer is paid based on how many numbers drawn match the numbers selected on the ticket and according to the paytable selected with regard to the wager amount. Alternatively, the casino kiosk 10 may select the numbers for the customer. Once this is done, the casino kiosk 10 may store the information in the memory of the CPU 28 or other memory device of the casino kiosk 10. The information may be programmed onto a notification device 20. An identification number of the notification device 20 may be stored in the memory of the CPU 28 or the game servers 28A along with the betting information. Once a round is played, the transmitter 33 will send out a notification signal of winner wagers for that particular round. The notification signal may further be received and resent via the transmitter/receiver devices 36. Winner notification devices 20 will receive the notification signal and send one of a visual, audible or sensory signal to indicate a winning wager. A live keno game works in the same manner but the live game is shown on the screens 16 and or 26. The user may stay at the kiosk 10 to watch and play or may leave with the notification device 20.

Other casino games may be played without departing from the spirit and scope of the present invention. For each casino game played on the casino kiosk 10, the first screen 16 may show the different questions and or decisions that the customer needs to answer. The answers are then used for different wager options.

Figure 6:
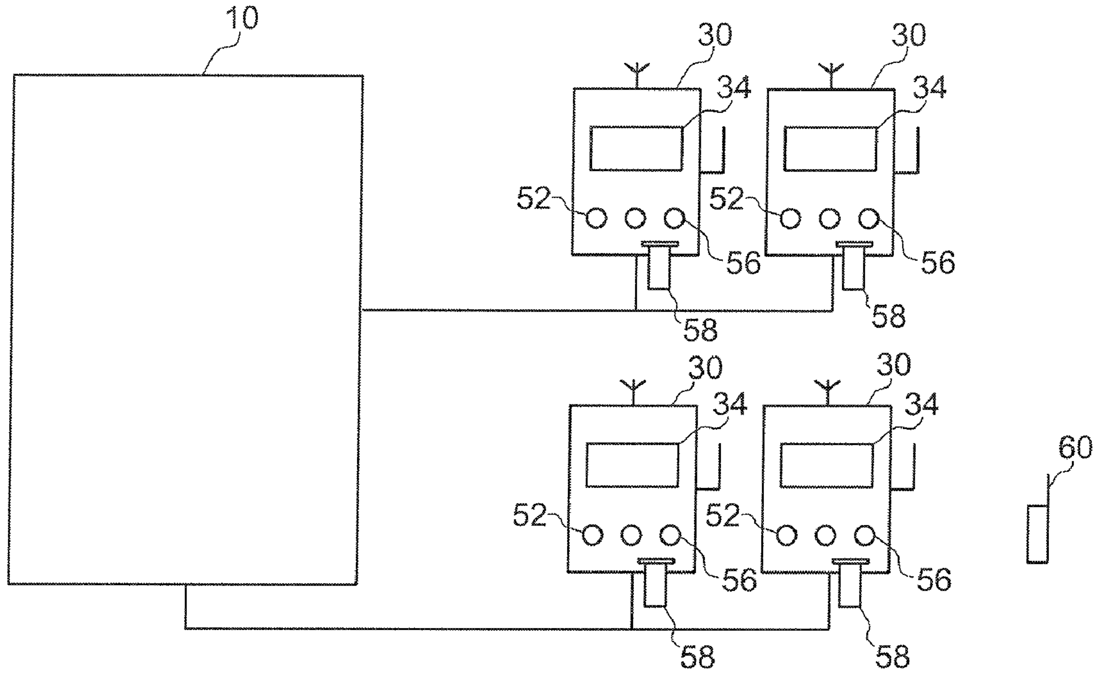
FIG. 6 is a block diagram of another embodiment of the present invention.

Referring now to FIG. 6, another embodiment of the present invention is shown. In this embodiment, a plurality of slot machines 50 may be coupled to the kiosk 10. Each slot machine 50 may be coupled to the kiosk 10 in different manners. For example, the slot machine 50 may be hard wired to the kiosk 10. Alternatively, the slot machine 50 may be wirelessly coupled to the kiosk 10. The above are given as examples and should not be seen in a limiting manner.

Anytime during the slot play by the customer, if the customer wants to take a chance gambling at Keno, Bingo, Roulette, or any of the games played on the kiosk 10, the customer presses a transfer game button 52 on the slot machine 50. The slot machine 50 will now connect to the kiosk 10. A screen 54 on the slot machine 10 will show the same information as shown on the first screen 16 of the kiosk 10. The screen 54 may now be used to display the kiosk gaming information to the customer. In accordance with one embodiment, the screen 54 will show a main menu listing all the casino games that may be played on the casino kiosk 10. The user may select one or more games to play by using an input device 56. The input device 56 may be buttons on the slot machine 50, a keyboard, a mouse, roller ball, or the like. Alternatively, the screen 54 may have touch button features. The listing of the above is given as an example and should not be seen in a limiting manner.

After the customer selects a game to be played, and the playing options are entered, the slot machine 50 may dispense a game slip 58. The game slip 58 may have information such as but not limited to: betting amounts, the game played, numbers selected, and the like. This information may be printed on the game slip 58 or encoded as a bar code. The game slip 58 may further have a pin number. The customer may then take the game slip 58 when the customer leaves the slot machine 50. The game slip 58 may then be taken to the kiosk 10 and be used to collect his/her winnings. This may be done by entering the pin number into the kiosk 10 to see if he/she has won, inserting the game slip 58 into a reader in the kiosk 10 to see if he/she has won, etc.

In accordance with another embodiment, the customer may enter a telephone number via the input device 56. The kiosk 10 may then send a signal to the cellular phone 60 of the telephone number entered to inform the customer if he or she has won. Thus, the customer may leave the slot machine 50 and still be informed if he/she has won. In accordance with one embodiment, a text message is sent to the customer to inform the customer that he/she has won. The text message may include information such as the round the customer won, the dollar figure the customer has won, etc. The text message may further include a security number which the customer may be required to enter in order to receive his/her winnings.

If the customer receives a signal on his/her telephone of a winning round, the customer may return to the casino kiosk 10 to collect his/her winnings. The customer may collect his/her winning in different manners. For example, the game slip 58 may be inserted into the kiosk 10 to retrieve any winnings. The game slip 58 may be bar coded. The bar code is read by the kiosk 10 to verify a winning game slip 58. Alternatively, the customer may enter his/her telephone number into the kiosk 10. The customer may further be required to enter the security number that was sent in the text message and or printed on the game slip 58. The above information is entered into the kiosk 10 via the input device 18. Once the information is entered, the kiosk 10 will verify the information to determine if the customer had a winning round. If so, the casino kiosk 10 will issue either the monetary winnings or a voucher to turn into a cashier via a payout device 24.

In an alternative embodiment, once the customer presses a transfer game button 52 on the slot machine 50, the slot machine 50 will now connect to the kiosk 10. A screen 54 on the slot machine 10 will show the same information as shown on the first screen 16 of the kiosk 10. However, in this embodiment, the customer may only select a game to be played, and the playing options for the next round to be played. In this embodiment, winnings and losings (i.e., credits) will be added or subtracted from the credits on the slot machine 50.

In accordance with another embodiment, a customer may have a casino members card 58 which may be inserted into the slot machine 50. Customers place money bets for the games on the kiosk 10 on their casino member cards 58. If the casino member card 58 has no money left on it they can still place a wager by inserting cash into the slot machine 50.

An extra feature in the present embodiment is that after the bets for the kiosk game has been entered into the slot machine 50, the screen 54 may display a message asking the customer if he/she wishes to make a repeat bet. By touching an option button 56, the customer will automatically make the same bet for the next round (i.e., same game selected, same numbers, etc.).

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A gaming system comprising:

a gaming kiosk, wherein the gaming kiosk comprises:

an input device for selecting a casino game to be played via the gaming kiosk, gaming rounds to be played, and game criteria; and a dispenser for distributing a result responder;

a transmitter device for transmitting game notification signals to at least the result responder to indicate at least one of a winning or losing round by a player.

2. The system of claim 1, further comprising a plurality of transmitter/receivers positioned around a perimeter of an area where the gaming kiosk is positioned, the transmitter/receivers receiving the game notification signals transmitted by the transmitter device and retransmits the game notification signals to at least the result responder.

3. The system of claim 2, wherein the plurality of transmitter/receivers deactivates the result responder when the result responder is outside of the perimeter where the transmitter/receivers are positioned.

4. The system of claim 1, further comprising at least one gaming server coupled to the gaming kiosk.

5. The system of claim 4, further comprising: at least one slot machine coupled to the gaming kiosk; and a transfer button on the at least one slot machine, the transfer allowing one to view the casino game from the gaming kiosk on the at least one slot machine.

6. The system of claim 5, further comprising an input device on the at least one slot machine, the input device allowing one to play the casino game on the gaming kiosk from the at least one slot machine.

7. The system of claim 6, wherein the input device further allows one to enter a cellular phone number for receiving the game notification signals instead of the result responder.

8. The system of claim 6, further comprising a dispenser device for dispensing a receipt of the gaming information entered by the input device.

9. The system of claim 6, wherein the receipt further contains information for collecting winnings.

10. A gaming system comprising:

at least one gaming server for hosting at least one casino game;

a gaming kiosk coupled to the gaming server, wherein the gaming kiosk comprises:

a dispenser for distributing a result responder:

an input device for selecting the at least one casino game to be played via the gaming kiosk, gaming rounds to be played, and game criteria;

a transmitter device for transmitting game notification signals to at least one of a remote device or a result responder to indicate one of a winning or losing round by a player; and a plurality of transmitter/receivers positioned around a perimeter of an area where the gaming kiosk is positioned, the transmitter/receivers receiving the game notification signals transmitted by the transmitter device and retransmits the game notification to the remote device.

11. The system of claim 10, wherein the plurality of transmitter/receivers deactivates the result responder when the result responder is outside of the perimeter where the transmitter/receivers are positioned.

12. The system of claim 10, further comprising: at least one slot machine coupled to the gaming kiosk; a transfer button on the at least one slot machine, the transfer allowing one to view the casino game from the gaming kiosk on the at least one slot machine; and an input device on the at least one slot machine, the input device allowing one to play the casino game on the gaming kiosk from the at least one slot machine.

* * * * *